(12) United States Patent
McCormick et al.

(10) Patent No.: US 6,330,840 B1
(45) Date of Patent: Dec. 18, 2001

(54) PLANETARY RATCHET WRENCH AND PIPE CUTTING TOOL

(76) Inventors: Gerald D. McCormick, P.O. Box 387, Freeport, FL (US) 32439; Everett B. James, Jr., 2206 W. 11th St., Panama City, FL (US) 32401

( * ) Notice: Subject to any disclaimer, the term of this patent is extended or adjusted under 35 U.S.C. 154(b) by 0 days.

(21) Appl. No.: 09/495,373

(22) Filed: Feb. 1, 2000

(51) Int. Cl.[7] ................................. B25B 17/00
(52) U.S. Cl. .................. 81/57.3; 81/57.24; 81/180.1; 7/142
(58) Field of Search .................. 81/57.3, 57.13, 81/57.14, 57.29, 58.2, 57.24, 180.1, 184, 185.2; 30/122; 7/142

(56) References Cited

U.S. PATENT DOCUMENTS

| | | | |
|---|---|---|---|
| 4,649,778 | 3/1987 | Bottoms | 81/57.33 |
| 5,544,553 | 8/1996 | Galat | 81/57.3 |
| 5,697,266 | 12/1997 | Wilson, Jr. | 81/57.14 |

*Primary Examiner*—D. S. Meislin
(74) *Attorney, Agent, or Firm*—William B Noll

(57) ABSTRACT

A planetary ratchet wrench with an optional add-on pipe cutting tool. The basic tool includes first and second intermeshing gear members, where one of the gear members includes a pair of arcuate shaped segments, pivotally engaged, that open to receive a pipe connection and close to form a continuous circular gear member. To the second of the gear members, a ratchet arm, removably secured to the second gear member, is provided to effect rotation of the respective gear members. Stabilizing arm is provided to allow the rotation of the gear members from a position remote from the meshing gear members. Further, a pipe cutting tool may be an add-on to the tool for rotation with the first of the gear members.

11 Claims, 8 Drawing Sheets

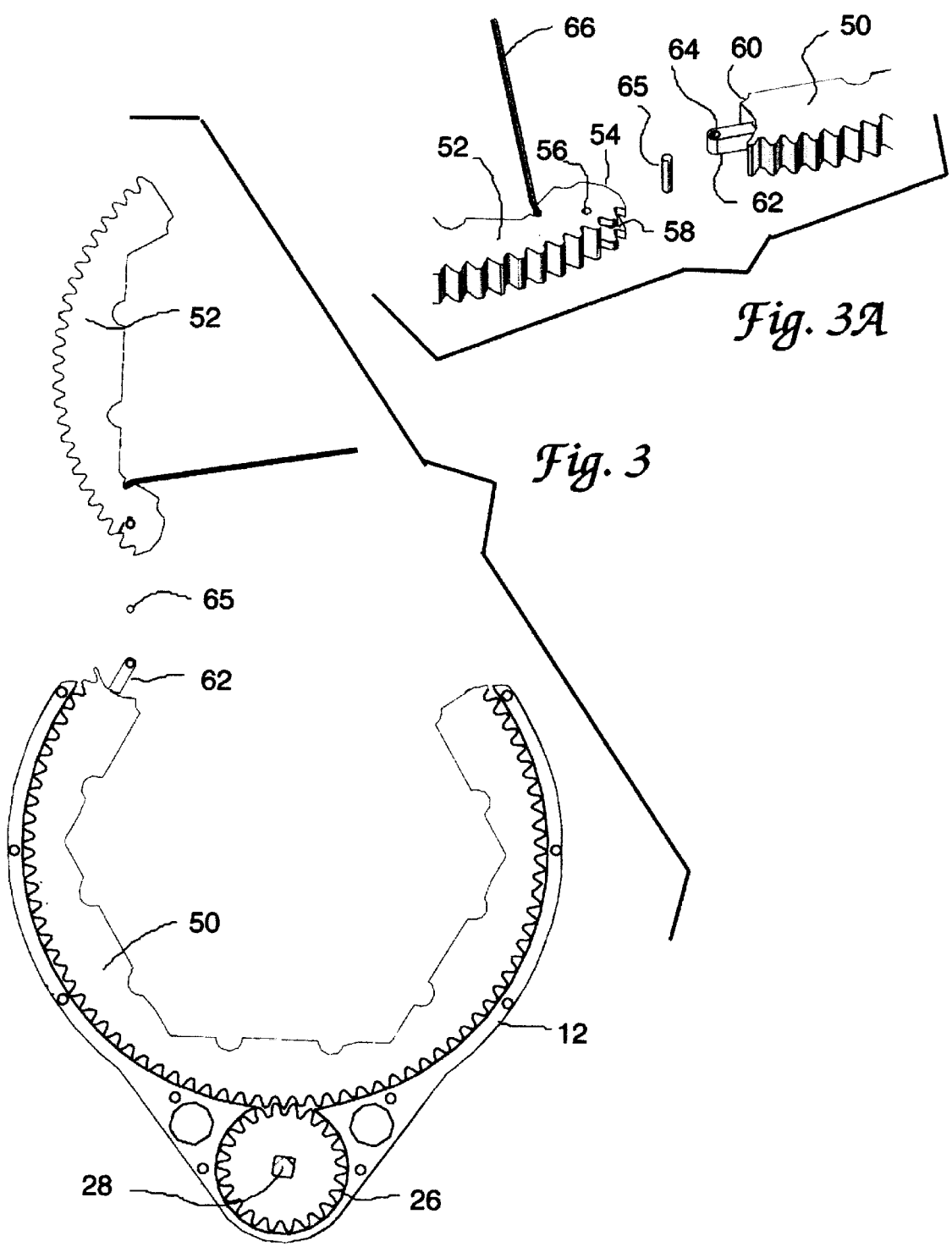

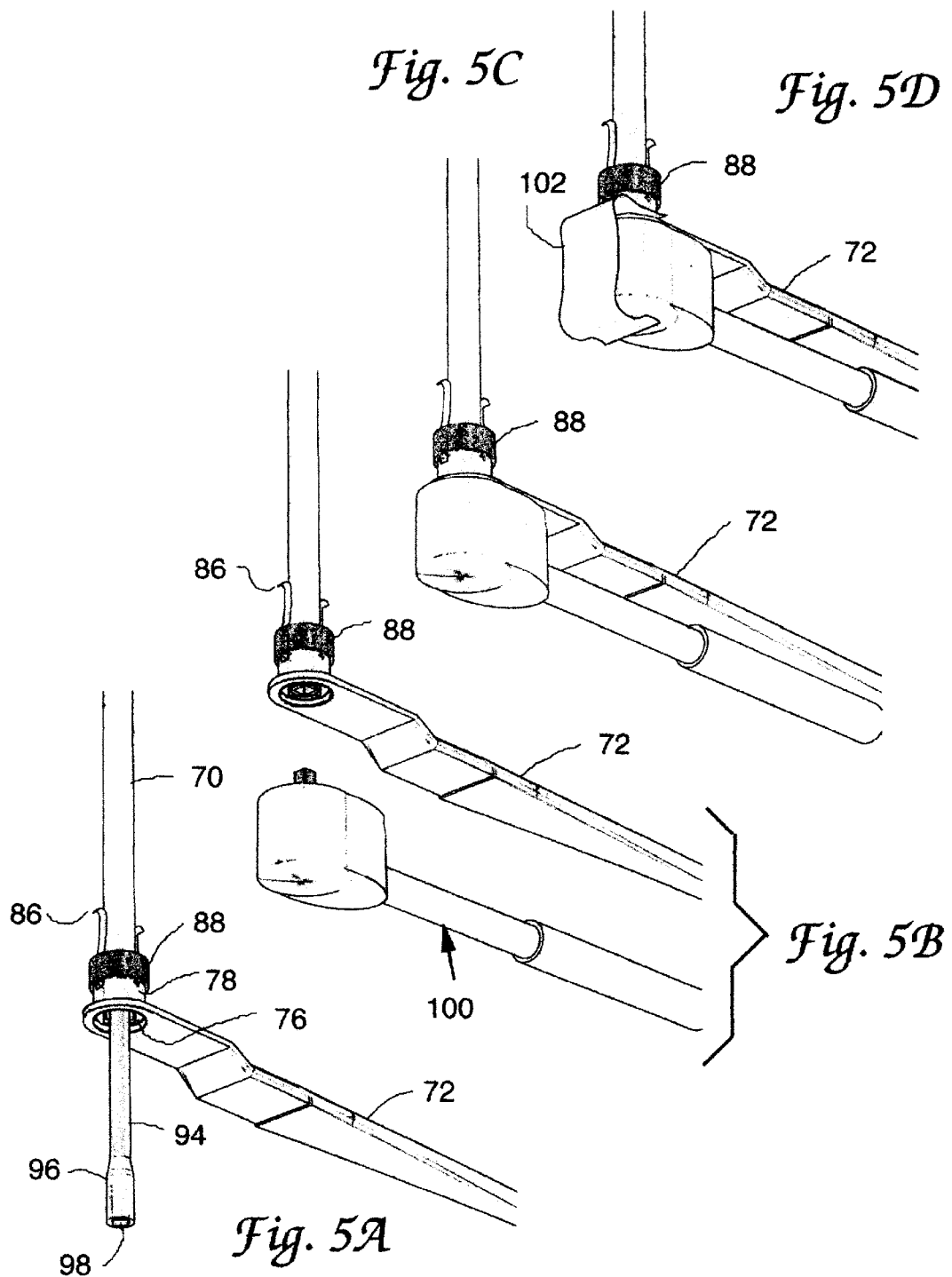

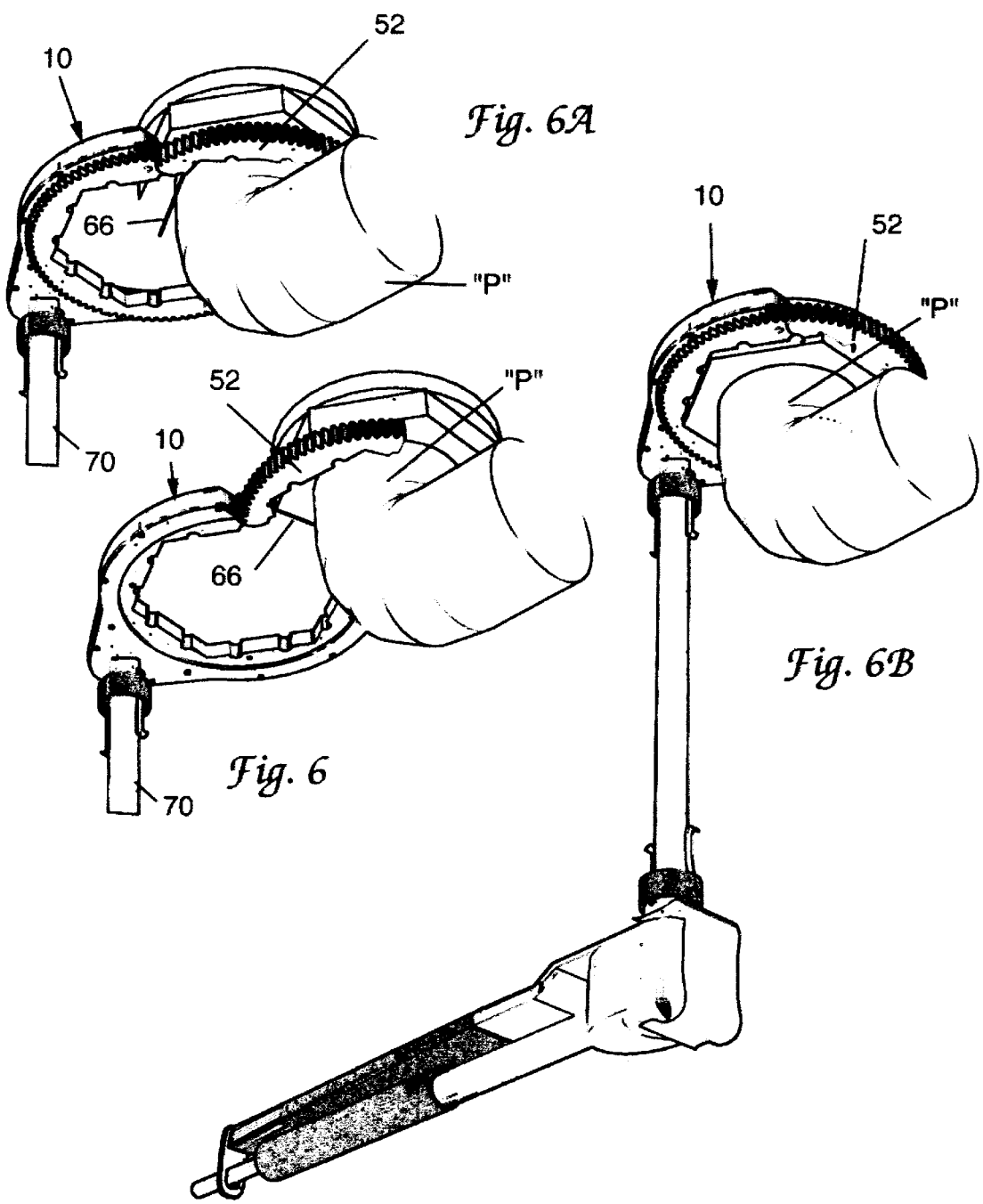

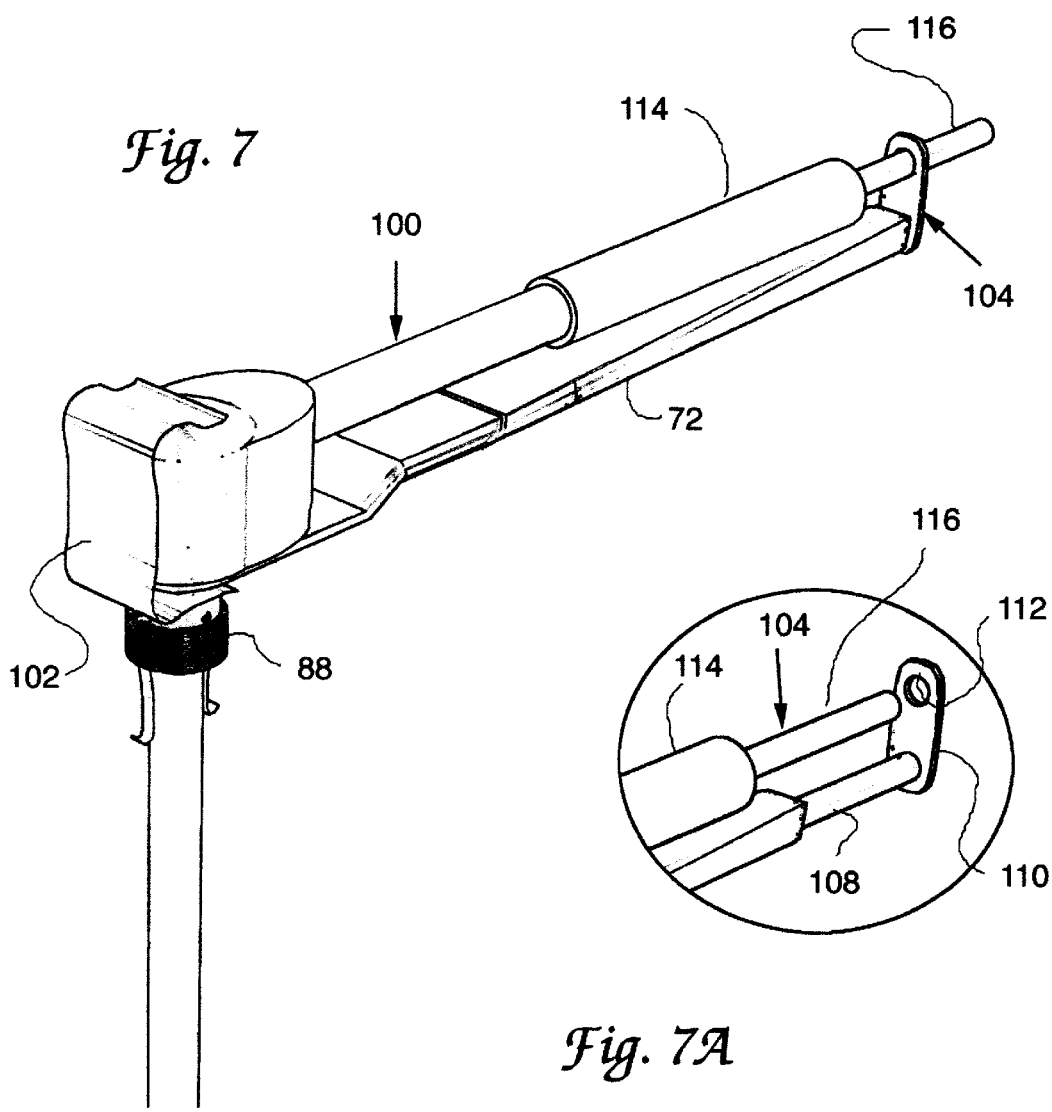

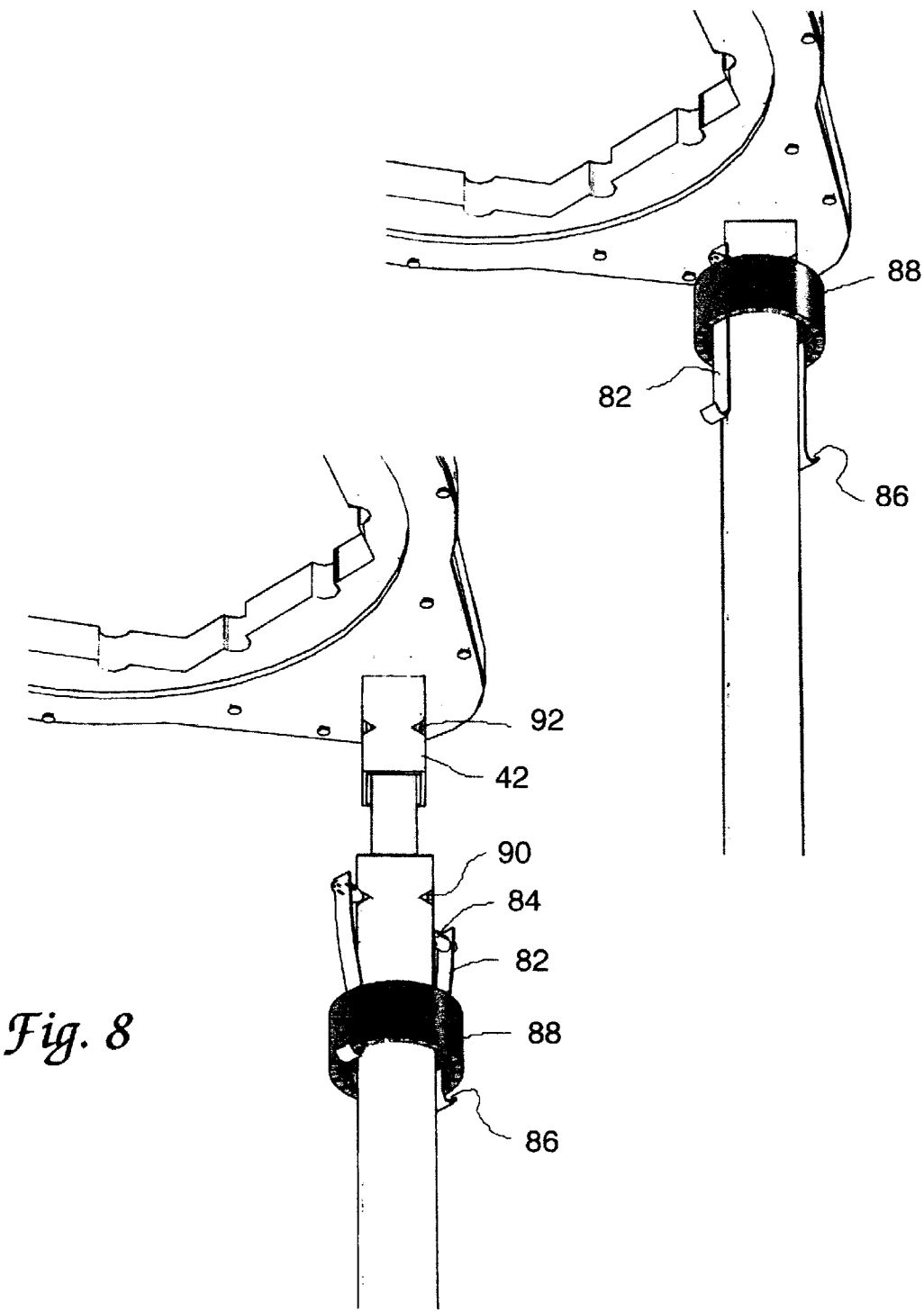

PLANETARY RATCHET WRENCH AND PIPE CUTTING TOOL

FIELD OF THE INVENTION

This invention is directed to the field of ratcheting tools, more particularly to an improved pipe wrench and pipe cutting tool utilizing a planetary gear arrangement, where the device has special utility in limited access applications.

BACKGROUND OF THE INVENTION

The present invention relates to a planetary ratcheting tool, such as may be used on larger diameter items, like pipes and pipe connections, and equipment filters, for example, where access thereto is restricted.

Pipe wrenches and ratchet wrenches are common tools for most households, such that their mechanical use and principles of leverage use are well known. Typically, one must have ample room in which to rotate the tool. Unfortunately, there are special applications where access to the pipe connection, for example, is limited. One such application is where a leaking pipe joint, such as between floors, must be repaired, or a poorly accessible pipe must be cut. With a typical pipe wrench, a large hole would have to be made in the ceiling of the lower level, in order to properly manipulate, i.e. rotate the pipe wrench. And, since the lower level is presumably a finished room, the large opening in the ceiling must be repaired and the scars of such repair may be permanent. There is a need for a special application tool that allows for such repairs without causing excessive corrective work.

The prior art, though not necessarily meeting such a goal, offers some special application tools, as described in the following U.S. Patents:

a.) U.S. Pat. No. 5,697,266, to Wilson, Jr. teaches line fitting orientation guides for use with a split socket and socket drive assembly. The guides include an opening for receiving and abutting the line on which the fitting is maintained as the fitting is received and properly positioned in the socket. The orientation guide may be integral to either the socket or the drive assembly structure, or may be a separate unit mounted to the drive assembly structure.

b.) U.S. Pat. No. 5,544,553, to Galat, discloses an open-ended, off set geared nutrunner having a housing with an opening providing access to a socket opening in the driving gear. The device further includes a seating structure mounted around the opening to receive the head of a powered wrench in a non-threaded connection when a driving stud on the wrench has been received in the socket opening.

c.) U.S. Pat. No. 5,103,698, to Delaney, teaches a bung tool having a cylindrical body with a four-armed drive portion projecting from one end thereof and a six-armed drive portion projecting from the opposite end thereof, respectively for engagement with different types of bungs. A drive member reciprocates in a square cross-section axial bore through the body, being manually moveable by a handle which projects radially through a slot in the body. The drive lug of an associated drive lever is receivable in the opposite ends of the bore for respectively driving the two drive portions. The drive member reciprocates among two recessed positions respectively spaced from the opposite ends of the bore to allow insertion of the drive lug therein and a drive position projecting from one of the drive portions for driving engagement with a bung cap.

d.) U.S. Pat. No. 5,425,289, to Iwinski, relates to a tool for use in attachment of a drain basket to a drain hole in a basin or the like, and is provided in the form of a cylindrical body having lugs projecting longitudinally from one end thereof The drain basket has a lower cup-like portion with a plurality of drain apertures and a threaded portion on the exterior of the cup-like portion for attachment to a drain pipe, the cup-like portion receiving therein a strainer basket for retaining particles from water flowing from the basin to a drain pipe. The lugs of the tool are shaped and dimensioned to fit into the drain apertures near the bottom of the cup. Around the base or joint of the lugs with the tool body, there is a radially extending ring or ledge. The tool may be attached to the external bottom of the drain basket by inserting the lugs through the cup-like portion and into the slots, then applying the lower flange around the tool body and threading it onto the lower threaded fitting which extends down from the cup.

e.) U.S. Pat No.4,649,778, to Bottoms, relates to apparatus which can be utilized on a drilling rig to aid in rotating drill pipe sections to connect and disconnect them. The apparatus includes a cat's head chain device to rotate the pipes but which avoids the danger arising when workmen wrap the chain around a pipe. The apparatus further includes a jaw assembly which can be installed around a pipe section, and which has teeth on its inner surface to engage the pipe and sprockets on its outside to engage the cat's head chain so the chain can turn the jaw assembly. A stationary frame surrounds the jaw assembly while permitting it to rotate therewithin, the frame also carrying a backup roller to keep the chain engaged with the sprockets of the jaw assembly.

The prior art described above fails to offer the special needs for performing corrective work in limited access locations. Further, none of such prior art, nor any commercial products known to the inventors, combines the unique attributes of this invention, namely, a pipe wrench and pipe cutting tool utilizing a planetary gear arrangement. The manner by which this invention achieves the attributes hereof will become apparent to those skilled in the art from the following specification, particularly when read in conjunction with the accompanying drawings.

SUMMARY OF THE INVENTION

This invention relates to a planetary gear, ratcheting wrench tool operable in combination with a conventional ratcheting tool, particularly for working on pipes and pipe connections that are not readily accessible with conventional tools. The tool of this invention can be used for generally large diameter pipe connections, such as 3 to 4" diameter pipe, or for cutting such pipe. The tool comprises a U-shaped casement member having a pair of circumferential arms defining an essentially circular space, and a wing extension extending planarly therefrom. The wing extension includes a circular opening in tangential communication with the circular space. As a pipe connection tool, the tool hereof may further include a circular drive gear, having peripheral gear teeth thereabout, positioned for rotative movement within the opening, and a C-shaped insert, sized for rotative movement and positioned within the casement member. The insert is characterized by a discontinuous periphery with gear teeth thereabout and extending from a first end to a second end, for engagement with the peripheral gear teeth of the circular drive gear. Further, the insert, removable and replaceable, is internally configured to engage a work piece, such as a pipe coupling. Finally, the tool, in this embodiment, includes a fixed closure member which is secured to the first end of the insert. The closure member is open in the inoperable position to allow the device to be placed about the work piece, and is closed in the operable position by contact with the work piece. Since a prime feature of the device hereof is to work in limited access locations, a ratcheting tool, with an extension, may be used. Specifically, such tool engages the circular drive gear to effect rotative movement of the gear engaging insert.

A modified use for the tool of this invention is as a pipe cutting tool, particularly for larger diameter pipes. The tool is modified by incorporating spring biased pivotal arms, mounting a rotary cutting blade, where such pivotal arms and blade are secured for rotation on the circular drive gear. Preferably, the pivotal arms and blade are mounted between a pair of C-shaped, planar plates, where one of said plates overlies and is secured to the circular drive gear.

Accordingly, an object of this invention is the provision of a planetary ratcheting device, utilizing a ratcheting tool, to effect rotative movement of a work piece located in a limited access area.

Another object of this invention lies in the use of a device having a planetary gear arrangement that offers leverage advantages to loosen and/or tighten difficult to reach pipe connections, for example.

A further object hereof is the provision of a closure mechanism that is activated by contact with a work piece to allow positioning of the tool of this invention without visual confirmation.

Still another object of the invention is the provision of a pipe cutting add-on mechanism that may be incorporated into the rotating gear mechanism for cutting pipes.

These and other objects will become apparent to those skilled in the art from the following description.

BRIEF DESCRIPTION OF DRAWINGS

FIG. 3 is an exploded, partial top plan view of the mechanism of FIGS. 1 and 2.

FIG. 3A is an exploded, partial perspective view illustrating the pivoting relationship for the rotary segment of FIG. 3.

FIG. 5A is a partial perspective view illustrating a tool stabilizing sleeve and arm, with a tool ratcheting arm slidably received in the sleeve.

FIG. 5B is a partial, exploded perspective view of the assembly of FIG. 5A, with a conventional ratchet positioned for engagement with the end of said ratcheting arm.

FIG. 5C is a partial perspective view of the assembly of FIG. 5B.

FIG. 5D is a partial perspective view, similar to FIG. 5C, further showing a U-shaped joining clip to hold the ratchet to the stabilizing arm.

FIG. 6 is a partial perspective view of the tool hereof positioned for engaging an overhead pipe connection, by way of example.

FIGS. 6A and 6B are partial perspective views showing intermediate and final positions for engaging the pipe connection and tool of FIG. 6.

FIG. 7 is an enlarged perspective view of a conventional ratchet, further illustrating a power locking mechanism.

FIG. 7A is a partial perspective view showing the sliding manner of locking the power locking mechanism to the ratchet.

FIGS. 8 and 8A are perspective views, respectively, illustrating pre and final stabilizing positions for the power locking mechanism of FIG. 7.

DETAILED DESCRIPTION OF PREFERRED EMBODIMENT

Figure 1:
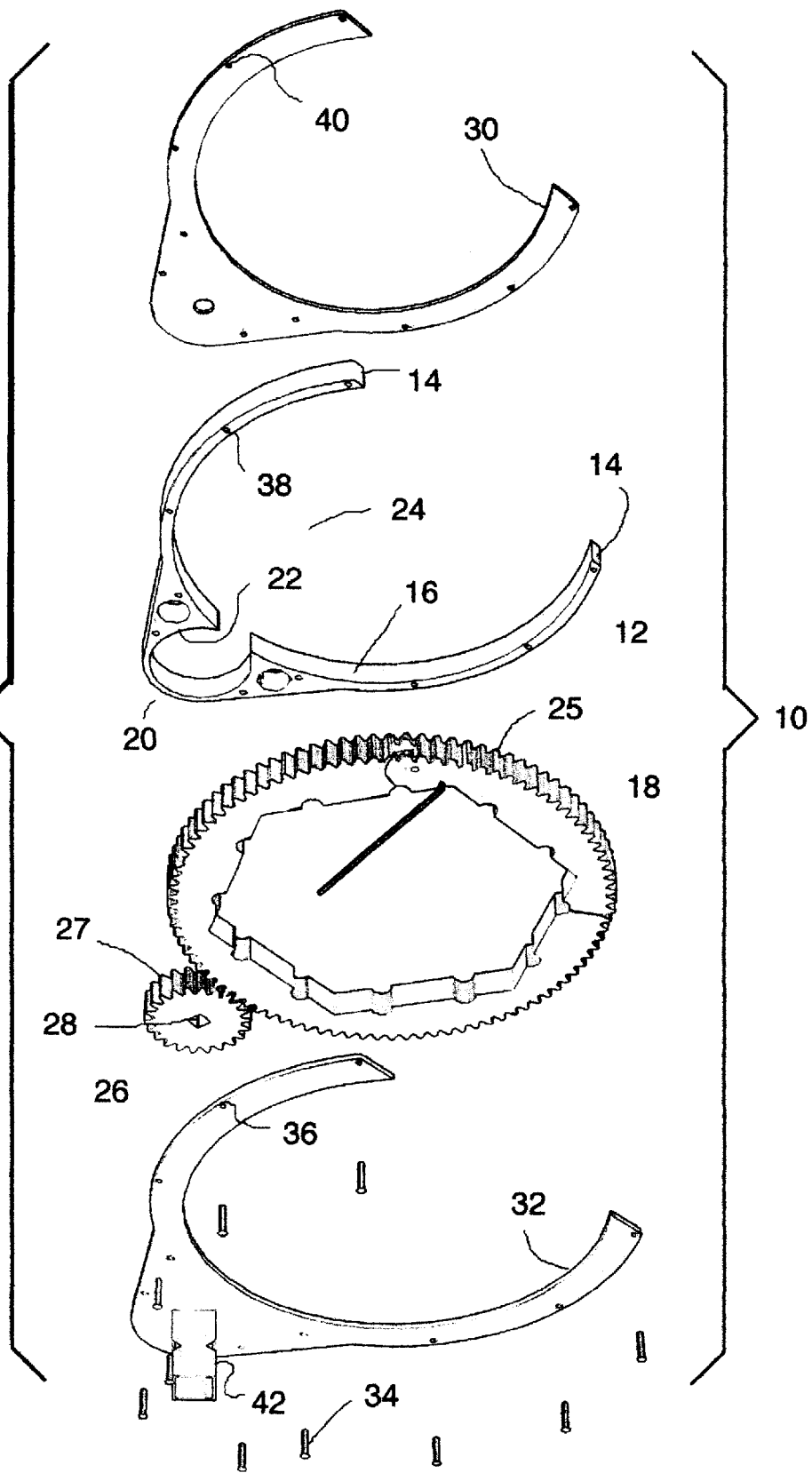
FIG. 1 is an exploded perspective view of the planetary rotating mechanism for the planetary ratchet wrench and cutting tool according to the present invention.

The present invention is directed to a planetary ratchet wrench device, with an optional add-on cutting tool, particularly for large diameter items, such as pipes and pipe connections, where access to the items are limited.

The device, to be used in conjunction with a conventional rotating ratchet mechanism, includes a generally C-shaped planar housing, having a closing arm, mounting a discontinuous planetary gear, and a companion driving gear to selectively rotate the discontinuous planetary gear in a clockwise or counter-clockwise direction. The device will now be described in conjunction with the accompanying drawings, where like reference numerals represent like components or features throughout the several views.

However, before detailing features of the device, it may be helpful to briefly review the operation of a ratchet wrench and its relationship to the device hereof A ratchet wrench, as known in the art, comprises a housing having an elongated handle with a circular eyelet at one end thereof, where the eyelet contains a rotating mechanism that can be fixed to drive an attached tool in one of two directions, i.e. clockwise or counter-clockwise. That is, by simply turning an external pivotal latch or switch, positioned axially of said mechanism, such as about 90 degrees, one can either tighten or loosen a hex head nut, for example. To engage the attached tool, the opposite side of the rotating mechanism includes a generally square, in cross section, projection that seats within the attached tool. The device hereof, as will be apparent in the description which follows, includes a complementary, generally square socket to receive the projection, or extension, as the case may be.

Figure 2:
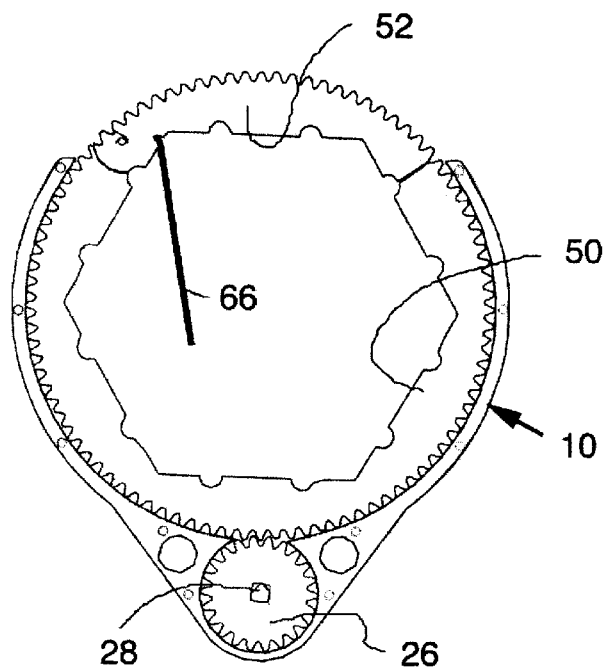
FIG. 2 is a top plan view of the assembled mechanism of FIG. 1.

Turning now to the several Figures, where like reference numerals represent like components or features throughout the several views, FIG. 1 is an exploded, perspective view illustrating the planetary rotating mechanism 10 of this invention. The planetary rotating mechanism 10 comprises a C-configured, planar housing 12, where said housing is defined by a pair of circumferential arms 14 having a vertically oriented inner face 16, for receiving in a rotating relationship, a first rotary gear member 18, as later described. The planar housing 12 further includes a planar extension 20 containing a central, circular slot 22, where said slot is in open communication with the space 24 defined by said circumferential arms 14. The slot 22 is sized to receive a second rotary gear member 26 for rotative movement therewithin. As best seen in FIGS. 1 and 2, by virtue of the communication between the circular slot 22 and space 24, said first and second rotary gear members 18,26, are in an intermeshing relationship, by virtue of external gear teeth 25, 27, such that rotation of the second rotary gear member 26 effects a counter rotation of the first rotary gear member 18. As will be explained hereafter, the second rotary gear member 26 includes a central rectangular opening 28 for receiving a rotary ratcheting arm. Finally, the second rotary member 18 is internally configured, such as with a hexagonal profile, to engage a complementary hexagonally configured pipe connection, as known in the art.

Overriding the planar housing 12, on the top and bottom, are a pair of planar, C-configured members 30, 32, respectively, to contain the first and second rotary gear members 18, 26. The respective C-configured members 30, 32 are secured to the planar housing 12 by fastening members 34 secured through aligned apertures 36, 38, 40. Finally, the bottom C-configured member 32 is characterized by a vertically oriented sleeve extension 42, the function of which will be described later.

The first rotary gear member 18, the details of which are best illustrated in FIGS. 2, 3 and 3A, comprises first and second arcuate segments 50, 52, where such segments define a continuous circular gear, see FIG. 2. The first segment 50, extending about 270°, includes a slotted end 54, having a through aperture 56 extending through the slot portions 58, see FIG. 3A. The second segment 52, extending about 90°, includes a first end 60 having a lateral extension 62 containing a through aperture 64. The lateral extension 62 is sized to be slidably received between the slot portions 58, where a pin 65 may be inserted through aligned apertures 56, 64 to pivotally engage the segments 50, 52. A final feature of the first rotary gear member 18, more precisely the second segment 52, is the provision of a laterally extending arm 66 projecting into the space 24, note FIG. 2. It will become apparent in the further description to follow that the laterally extending arm 66 functions to open and close the first rotary member 18, or more particularly to bring the segments into and out of alignment with one another.

Figure 5:
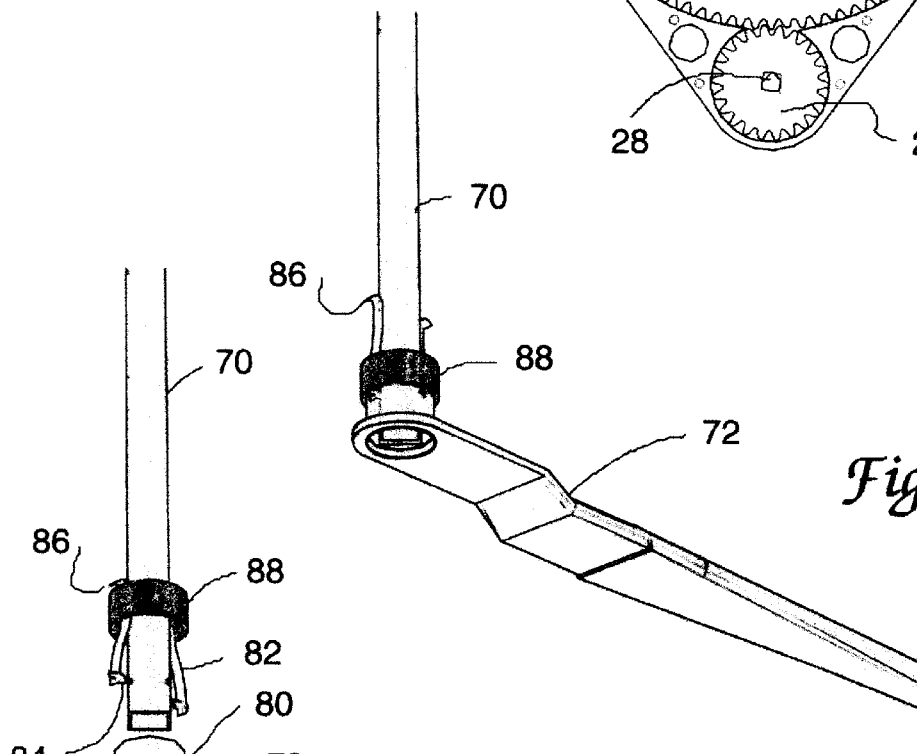
FIG. 5 is a partial perspective view, similar to FIG. 4, showing the stabilized tool hereof ready for use.
Figure 4:
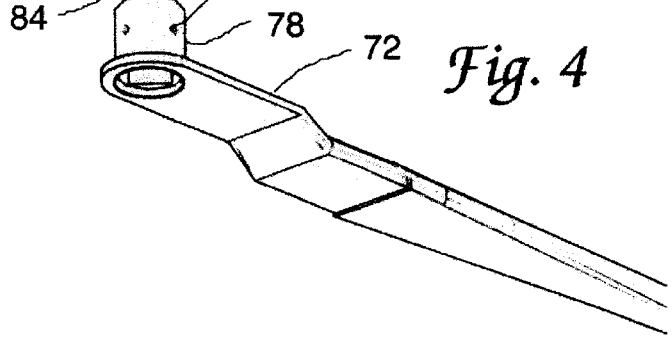
FIG. 4 is a partial perspective view illustrating a pre-stabilizing position for the tool of this invention.

Since a primary feature of the tool of this invention is to effect work in limited access areas, such as above ceiling or below floor locations, a typical use of the tool will require a ratchet extension arm 70, see FIG. 5A. Further, since ratcheting is from a position remote from the rotating mechanism, stability is important. Turning specifically to FIGS. 4 and 5 through 5D, the preferred tool of this invention includes a generally cylindrical stabilizing arm 72 to receive the ratchet extension arm 70. At a first end 74, the stabilizing arm 72 includes an opening 76 for slidably receiving the extension arm 70. Contiguous with the opening 76 is a hollow stub 78, featuring a pair of opposed apertures 80 (FIG. 4). The extension arm 70 features at its respective ends, see FIGS. 4 and 8, a pair of S-shaped spring arms 82, where the free ends include an inwardly directed head 84. The respective springs arms 82 have outwardly bent opposite ends 86 which function as sliding stops for an overriding sliding sleeve 88 (note FIG. 4). Adjacent the bent ends 86, the spring arms are fixed to the exterior of the extension arm 70. The locking operation may best be illustrated in FIGS. 8 and 8A. The ends of the extension arm 70 are inserted over the sleeve extension 42 and hollow stub 78, with the openings 90, 92 aligned to receive the inwardly directed arm heads 84. With the respective components so positioned, the overriding sliding sleeve 80 is moved along the spring arms 82 causing said arm heads 84 to pass into the openings 90, 92 to lock same until released. This arrangement fixes the stabilizing arm 72 to the planetary rotating mechanism 10, while providing a convenient means to manually hold the extension arm 70 to assist the desired work.

Thereafter, as best seen in FIG. 5A, a conventional ratcheting arm 94 may be inserted through the extension 70 into engaging contact with the opening 28 in the first rotary gear member 18. With the ratcheting arm 94 so positioned, its free end 96, featuring a rectangular recess 98, may be engaged by a conventional ratchet 100, as known in the art—see FIGS. 5A and 5B. To help hold the ratchet 100 in close proximity to the stabilizing arm 72, a C-shaped spring clip 102 may be used.

Cooperating with the clip 102, to temporarily secure the stabilizing arm 72 to the ratchet 100, is the latching mechanism 104 illustrated in FIGS. 7 and 7A. The free end 106 of the stabilizing arm 72 is provided with a retractable or sliding rod 108 mounting a pivotal member 110, where the pivotal member includes an off-set opening 112. The ratchet handle end 114 is provided with a rod like extension 116 of a diameter to be slidably received in the opening 112.

A feature noted previously, but not discussed in detail, is the means by which the tool hereof may be remotely positioned about a pipe connection, for example. FIGS. 6, 6A and 6B illustrate such means. In FIG. 6, with the second segment 52 of the first rotary gear member 18 in it's fully opened position, the tool is brought into contact with a pipe connection "P". As the tool is brought about the pipe connection, the laterally extending arm 66 contacts the pipe connection, which in turn pivots the second segment 52 into closing alignment with first segment 50 about the pipe connection (see FIG. 6B).

Figure 9:
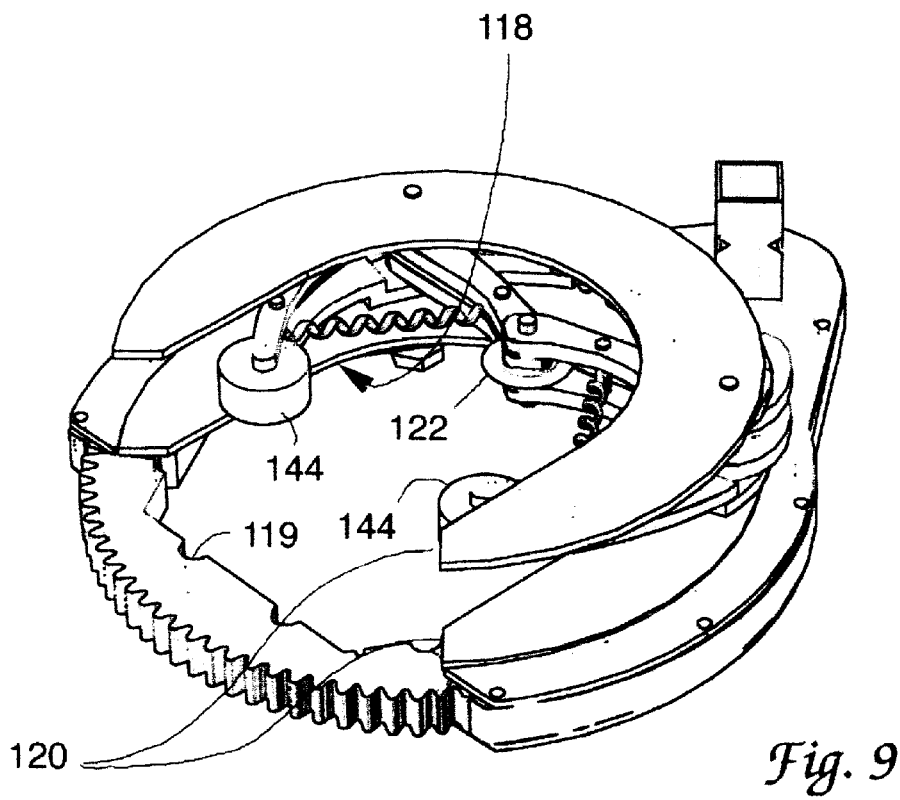
FIG. 9 is a perspective view of a pipe cutting attachment adaptable for use on the tool of this invention.
Figure 10:
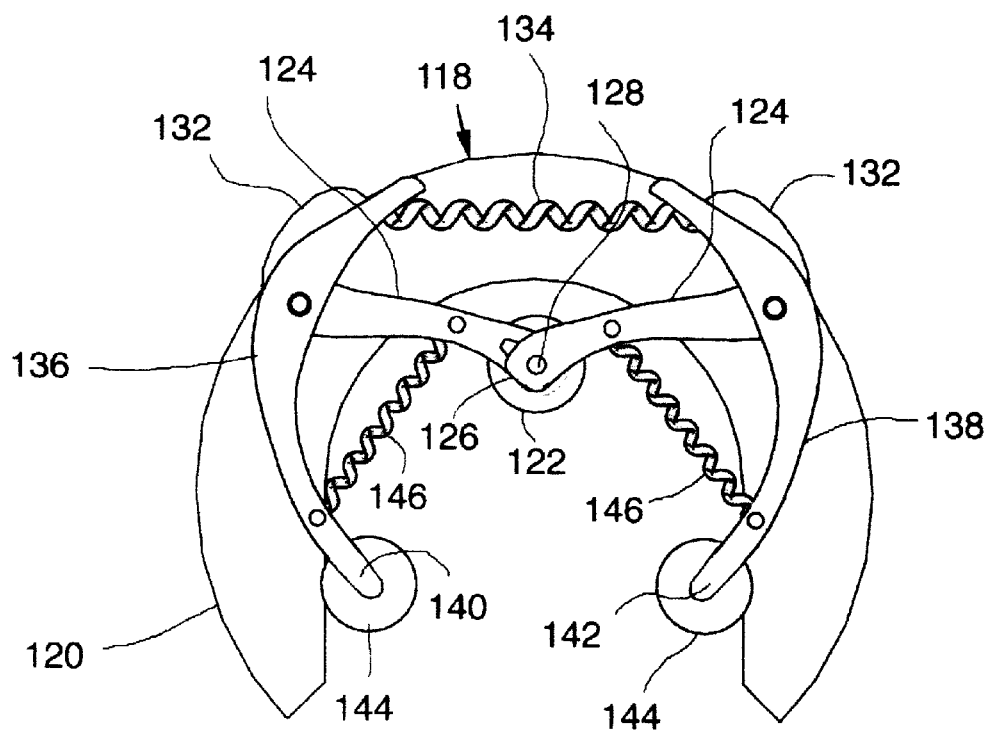
FIG. 10 is a partial top plan view of the pipe cutting tool of FIG. 9.

A unique feature of this invention is the provision of an add-on pipe cutter 118 illustrated in FIGS. 9 and 10. The pipe cutter may be removable secured to the bottom rotary mechanism, such as by fasteners, not shown, extending along the recesses 119 about the interior wall of the first segment 50. For example, there may be applications, such as between walls, where cutting of a pipe is required without making excessive openings in the wall. This new feature can accomplish this. In any case, the pipe cutter comprises a pair of planar, C-shaped, spaced apart members 120, with a pivotal cutter mechanism 122 mounted therebetween. The cutter mechanism comprises a pair of J-shaped arms 124 pivotally joined at respective first ends 126 along a shaft 128 which further mounts a rotary cutting wheel 130. The opposite ends 132 are joined by a spiral spring 134. Intermediate the respective ends, a pair of arcuate shaped arms 136, 138 are mounted for pivoting movement. The remote ends 140, 142 each mount a roller 144. In close proximity to such roller 144, each arm 136, 138 is connected to its complementary J-shaped arm 124 by a spiral spring 146. By the cooperative relationship of the respective arms and spiral springs, a pipe to be cut is positioned and retained therein in constant contact with the rotary cutting wheel 130. As the ratcheting tool is rotated, the pipe cutter 118 rotates allowing the cutting wheel 130 to cut into the pipe in a continuous cut until the pipe is fully severed.

It is recognized that variations, modifications and changes made be made to the tool and cutter add-on of this invention, particularly by those skilled in the art, without departing from the spirit and scope thereof. Accordingly, no limitation is intended to be imposed thereon except as set forth in the appended claims.

What is claimed is:

1. A C-shaped, planetary, ratcheting device operable in combination with a ratcheting mechanism, said device comprising:

a.) a U-shaped encasement member having a pair of circumferential arms defining an essentially circular space, and a wing extension extending planarly therefrom, where said wing extension includes a circular opening in communication with said circular space;

b.) a circular drive gear, having peripheral gear teeth, positioned for rotative movement within said circular opening;

c.) first and second pivotally joined arcuate members, sized
  (i) to form a continuous circle for positioning within said circular space, where said arcuate members feature gear teeth for operable engagement with said circular drive gear,
  (ii). to open to allow positioning a work piece within said encasement member,
  (iii). internally to accept said work piece;

d.) a pair of spaced apart, overlying C-shaped members to contain said circular drive gear and said arcuate members within said encasement member;

e.) means secured to one of said arcuate members to cooperate with said workpiece to effect closure of said arcuate members into said continuous circle; and, f.) means to rotatably ratchet said circular drive gear in a clockwise and counter-clockwise directions, where the rotative movement of said circular drive gear effects rotative movement of said arcuate members.

2. The C-shaped planetary, ratcheting device according to claim 1, wherein said circular drive gear includes a central rectangular recess for receiving a ratcheting shaft arm, and one of said overlying C-shaped member is provided with a sleeve aligned with said central rectangular recess.

3. The C-shaped planetary, ratcheting device according to claim 2, wherein said sleeve is sized to removably secure an elongated, hollow stabilizing arm, and said ratcheting shaft arm is slidably received in said stabilizing arm.

4. The C-shaped planetary, ratcheting device according to claim 3, wherein said stabilizing arm, at its respective ends, are provided with a pair of opposing spring arms movable by a sliding ring to effect engagement of said stabilizing arm to said sleeve.

5. The C-shaped planetary, ratcheting device according to claim 1, wherein one of said arcuate members includes a spring arm extending into said circular space, where contact between said spring arm and a workpiece cause pivoting of said one arcuate member into closed alignment with the other of said arcuate member.

6. The C-shaped planetary, ratcheting device according to claim 3, wherein the opposite end of said stabilizing arm includes a removably mounted, laterally extending stabilizing lever.

7. The C-shaped planetary, ratcheting device according to claim 6, wherein said stabilizing lever includes an opening at one end thereof and mounts a hollow sleeve for engagement with said stabilizing arm, and that said ratcheting shaft arm is passed through said stabilizing arm into engagement with said circular drive gear.

8. The C-shaped planetary, ratcheting device according to claim 7, where said ratcheting shaft arm includes a recess for receiving a conventional ratchet.

9. The C-shaped planetary, ratcheting device according to claim 8, wherein means are provided to align and temporarily secure the stabilizing lever to said conventional ratchet.

10. The C-shaped planetary, ratcheting device according to claim 1, including a pipe cutter implement secured to one of said arcuate members for rotative movement therewith, where said pipe cutter implement mounts a rotatry cutting blade.

11. The C-shaped planetary, ratcheting device according to claim 10, wherein said pipe cutter implement includes first and second pairs of spring biased, pivotally mounted arms, where one of said pairs of arms mount roller members for contacting a work piece positioned therewithin for cutting.

* * * * *